(12) United States Patent
Grivas et al.

(10) Patent No.: US 7,836,702 B2
(45) Date of Patent: Nov. 23, 2010

(54) GAS TURBINE COMBUSTOR EXIT DUCT AND HP VANE INTERFACE

(75) Inventors: Nicolas Grivas, Dollard-des-Ormeaux (CA); Bhawan B. Patel, Mississauga (CA); Oleg Morenko, Oakville (CA); Eric Durocher, Vercheres (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1103 days.

(21) Appl. No.: 11/532,231

(22) Filed: Sep. 15, 2006

(65) Prior Publication Data

US 2010/0236257 A1   Sep. 23, 2010

(51) Int. Cl.
*F02C 7/20* (2006.01)
(52) U.S. Cl. .............................. 60/796; 60/752; 60/760; 60/788; 415/139; 415/190; 415/209.4
(58) Field of Classification Search ................. 60/796, 60/797, 798, 799, 800, 52, 760, 804; 415/134, 415/139, 189, 190, 209.23, 209.4, 191
See application file for complete search history.

(56) References Cited

U.S. PATENT DOCUMENTS

| | | | |
|---|---|---|---|
| 3,286,461 A | 11/1966 | Douglas | |
| 3,302,926 A | 2/1967 | Bobo | |
| 3,529,906 A | 9/1970 | Borden et al. | |
| 3,670,497 A | 6/1972 | Sheldon | |
| 3,965,066 A | * 6/1976 | Sterman et al. | ............... 60/800 |
| 4,195,476 A | 4/1980 | Wood | |
| 4,635,332 A | 1/1987 | Cederwall et al. | |
| 4,668,164 A | 5/1987 | Neal et al. | |
| 4,702,670 A | 10/1987 | Winter | |
| 4,798,514 A | 1/1989 | Pask | |
| 4,821,522 A | 4/1989 | Matthews et al. | |
| 4,889,469 A | 12/1989 | Wilkinson | |
| 4,920,742 A | * 5/1990 | Nash et al. | ..................... 60/799 |
| 5,078,576 A | 1/1992 | Hayton | |
| 5,398,496 A | 3/1995 | Taylor et al. | |
| 5,407,319 A | 4/1995 | Harrogate et al. | |
| 5,417,545 A | 5/1995 | Harrogate | |
| 5,470,198 A | 11/1995 | Harrogate et al. | |

(Continued)

FOREIGN PATENT DOCUMENTS

GB   1 089 660   11/1967

(Continued)

OTHER PUBLICATIONS

Pratt & Whitney Canada JT15D-5F Maintenance Manual, selected pages from Chapter 72-50—Turbine Section.

*Primary Examiner*—Michael Cuff
*Assistant Examiner*—Young Choi
(74) *Attorney, Agent, or Firm*—Ogilvy Renault LLP

(57) ABSTRACT

An assembly for a gas turbine engine includes a combustor and a vane assembly disposed downstream thereof. A portion of an outer platform of the vane assembly defines an axial sliding joint connection with the combustor, and includes a plurality of depressions located in an outer circumferential surface thereof opposite the combustor. The depressions are disposed in regions of expected higher thermal growth about the circumference of the outer platform such that thermal growth of the entire outer platform is substantially uniform circumferentially therearound.

18 Claims, 5 Drawing Sheets

U.S. PATENT DOCUMENTS

| | | |
|---|---|---|
| 6,269,628 B1 | 8/2001 | Gates |
| 6,860,108 B2 * | 3/2005 | Soechting et al. ............. 60/752 |
| 6,895,757 B2 * | 5/2005 | Mitchell et al. ............... 60/772 |
| 2005/0120718 A1 * | 6/2005 | Markarian et al. ............ 60/800 |
| 2009/0208326 A1 * | 8/2009 | Durocher et al. ............ 415/134 |

FOREIGN PATENT DOCUMENTS

| | | |
|---|---|---|
| GB | 1 091 573 | 11/1967 |
| GB | 2 102 897 | 2/1983 |

\* cited by examiner

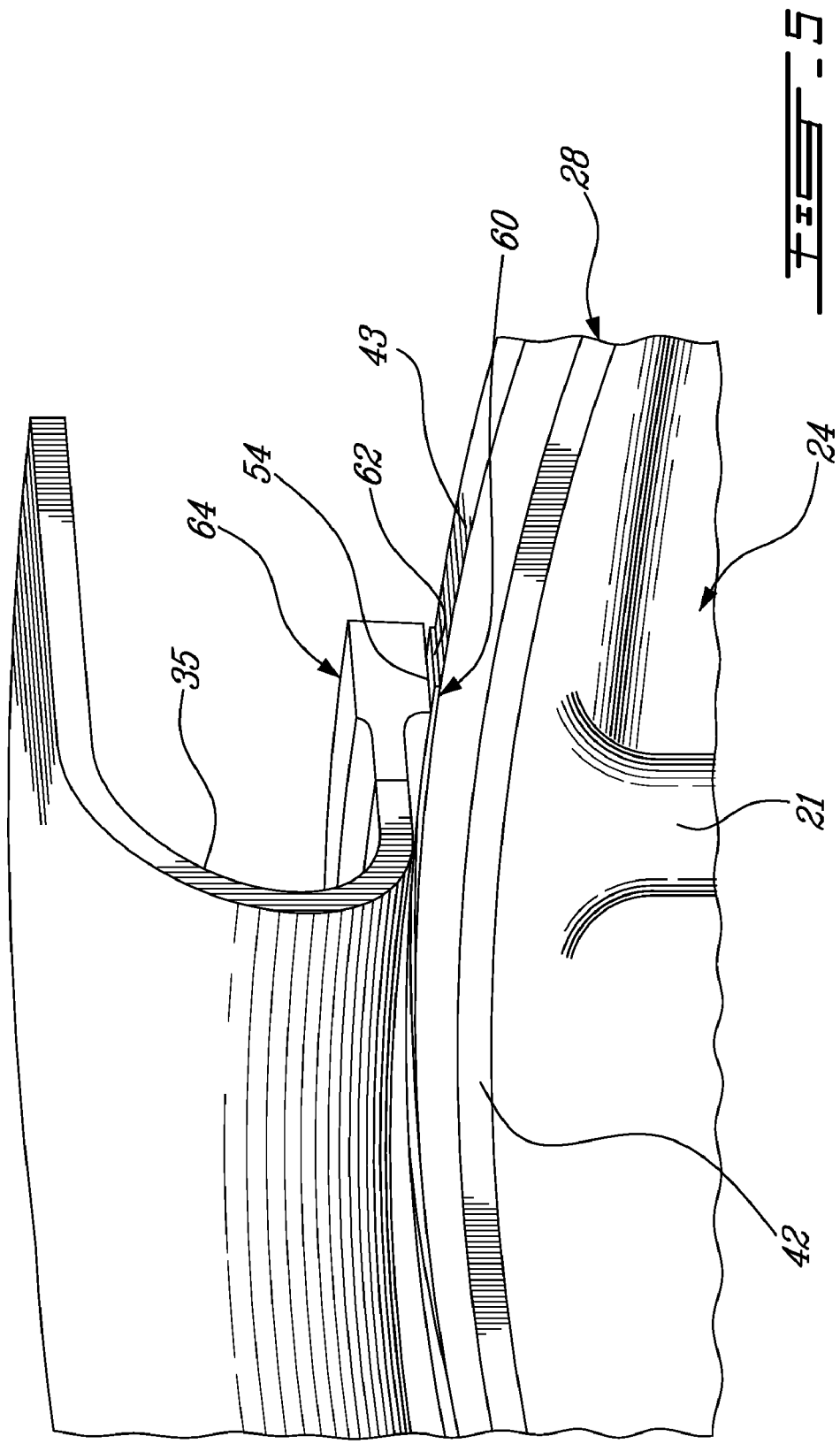

GAS TURBINE COMBUSTOR EXIT DUCT AND HP VANE INTERFACE

TECHNICAL FIELD

The present invention relates generally to gas turbine engines, and more particularly to the interface between a high pressure turbine vane platform and an exit duct of a combustor therein.

BACKGROUND OF THE INVENTION

The secure and well sealed inter-engagement of the combustor and the high pressure turbine (HPT) stage immediately downstream therefrom is important in a gas turbine engine. This portion of the engine experiences the highest temperatures, and therefore the joint formed between the combustor and the HPT vane assembly must be able to accommodate thermal deflections of the two structures due to the high temperatures. Thermal growth mismatch between the combustor walls and the platforms of the HPT vane may occur for a variety of reasons, such as a result of differences in materials, structure, temperature variations, surface temperatures and gas flow patterns for example. Accordingly, the joints linking these two structures must be able to accommodate these deflections, without reducing sealing effectiveness. A tight seal therebetween during engine operation is required to prevent high pressure air, typically fed to the regions around the combustor, from leaking into the lower pressure gas flowing through the turbine section.

However, achieving an ideal clearance between the small exit duct (SED) and the HPT vane platform can be difficult, as too tight a clearance can cause binding between the two parts such that relative movement therebetween is limited and therefore thermal growth mismatch cannot be readily absorbed by a suitable joint arrangement, while too large a clearance gap therebetween can result in hot gas leakage and a reduction in the pressure differential required for impingement airflow cooling of the hot SED surfaces.

SUMMARY OF THE INVENTION

It is accordingly an object of the present invention to provide an improved interface between a high pressure turbine vane platform and a combustor flange in a gas turbine engine.

Therefore, in accordance with the present invention, there is provided an assembly for a gas turbine engine, the assembly comprising a combustor and a vane assembly downstream from the combustor, the vane assembly including a plurality of airfoils radially extending between annular inner and outer platforms defining an annular gas path therebetween, at least the outer platform forming a first sliding joint connection with an adjacent outer combustor wall such that relative axial displacement therebetween is permitted, a radial clearance gap being defined between the outer platform and the outer combustor wall, said radial clearance gap being minimized at engine operating temperature such that radial sealing between the outer platform and the outer combustor wall is substantially provided, and wherein the outer platform includes a plurality of depressions located in an outer circumferential surface thereof opposite said outer combustor wall, said depressions being disposed in regions of expected higher thermal growth about the circumference of the outer platform such that thermal growth of the outer platform is substantially uniform circumferentially therearound and thus said minimized radial clearance gap is maintained during engine operation to prevent binding contact between the outer platform and the outer combustor wall.

There is also provided, in accordance with the present invention, an assembly for a gas turbine engine, the assembly comprising: a combustor having a combustor wall circumscribing a gas path therewithin and an exit duct end, the exit duct end having an outer flange portion radially spaced from the combustor wall in a direction away from the gas path to form an annular slot; a vane assembly disposed downstream of the combustor, the vane assembly including a plurality of airfoils extending between annular inner and outer platforms; and a portion of at least the outer platform extending axially within said annular slot and defining a sliding joint connection between the combustor and the vane assembly, the sliding joint connection permitting relative axial displacement between the vane assembly and the combustor, said portion of the outer platform including a plurality of depressions located in an outer circumferential surface thereof opposite said outer flange portion, said depressions being disposed in regions of expected higher thermal growth about the circumference of the outer platform such that thermal growth of the outer platform is substantially uniform circumferentially therearound.

There is also provided, in accordance with the present invention, a combustor-to-vane joint assembly for a gas turbine engine, the combustor including an annular exit end for mating with an annular vane ring assembly, the vane ring assembly including a plurality of airfoils radially extending between inner and outer platform rings, the joint comprising: inner and outer female retaining members integral with and defining a downstream end of the annular exit, the female retaining members each including spaced-apart annular portions; and inner and outer male insertion members integral with and defining an upstream end of the respective inner and outer platform rings of the vane ring assembly; the vane assembly being mounted to the combustor solely by insertion of the inner and outer male insertion members between the spaced-apart portions of the respective inner and outer female retaining members; and wherein at least the outer male insertion member of the outer platform ring has a plurality of depressions located in an outer circumferential surface thereof opposite at least one of said spaced-apart annular portions of said outer female retaining member, said depressions being disposed in regions of expected higher thermal growth about the circumference of the outer platform ring such that thermal growth of the outer platform ring is substantially uniform circumferentially therearound.

There is also provided, in accordance with the present invention, a method of providing an interface between a combustor and a vane assembly in a gas turbine engine, the method comprising: providing a vane assembly mounted to an exit duct of the combustor, the vane assembly having a plurality of airfoils radially extending between annular inner and outer platforms, at least the outer platform cooperating with a flange portion of the combustor exit duct to form an axial sliding joint therebetween; forming a plurality of depressions in a portion of the at least the outer platform opposite the flange portion, said depressions being disposed in local regions of expected higher thermal growth about the circumference of the at least the outer platform such that thermal growth of the entire outer platform is substantially uniform circumferentially therearound; determining a maximum amount of thermal growth differential exhibited between the flange portion and the at least the outer platform over an engine operating temperature range; and defining a radial clearance gap between the flange portion and the at least the outer platform at ambient temperature that is slightly greater than the determined maximum amount of thermal growth differential over the engine operating temperature range, such that the radial clearance gap is minimized but maintained during the engine operating temperature range thereby providing substantial radial sealing between the at least the outer platform and the combustor while preventing binding contact therebetween.

BRIEF DESCRIPTION OF THE DRAWINGS

Further features and advantages of the present invention will become apparent from the following detailed description, taken in combination with the appended drawings, in which:

FIG. 5 is a front perspective view of the interface between a small exit duct portion of the combustor and the high pressure turbine vane ring in accordance with the present invention.

DETAILED DESCRIPTION OF THE PREFERRED EMBODIMENT

Figure 1:
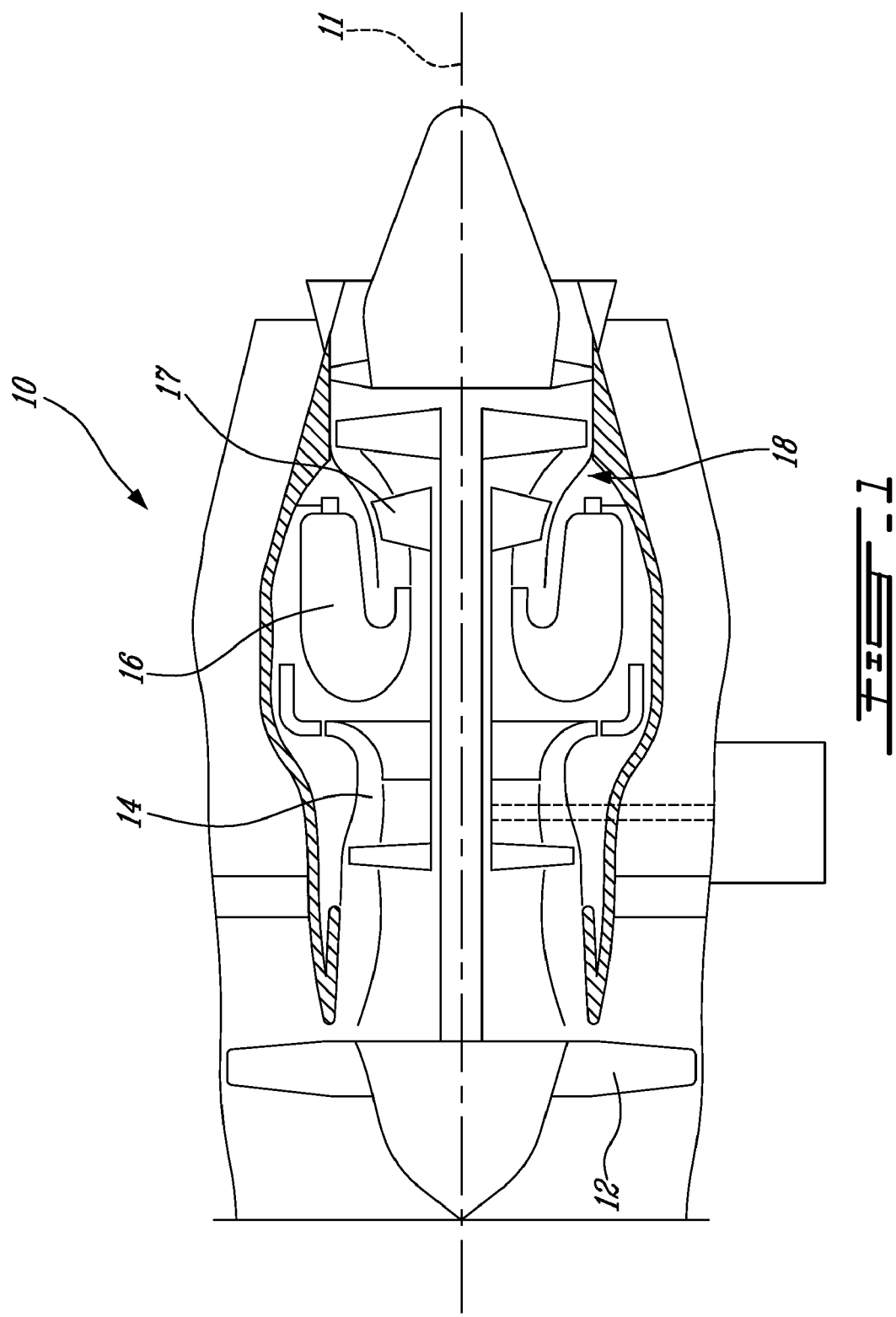
FIG. 1 is a schematic cross-section of a gas turbine engine.

FIG. 1 schematically illustrates a gas turbine engine 10 (a turbofan preferably adapted for use on an aircraft in subsonic flight in this case, though the invention may be practised in almost any gas turbine engine) generally comprising, in serial flow communication, a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The turbine section 18 further comprises at least a first, or high pressure (HP), turbine stage 17 which is immediately downstream from the combustor 16. The high pressure turbine (HPT) stage 17 includes a turbine rotor (not shown) with a plurality of radially extending turbine blades, and a HPT vane assembly 22 (see FIG. 2) immediately upstream therefrom. The HPT vane assembly 22 is therefore immediately downstream from the exit of the combustor 16 of the gas turbine engine 10.

Figure 2:
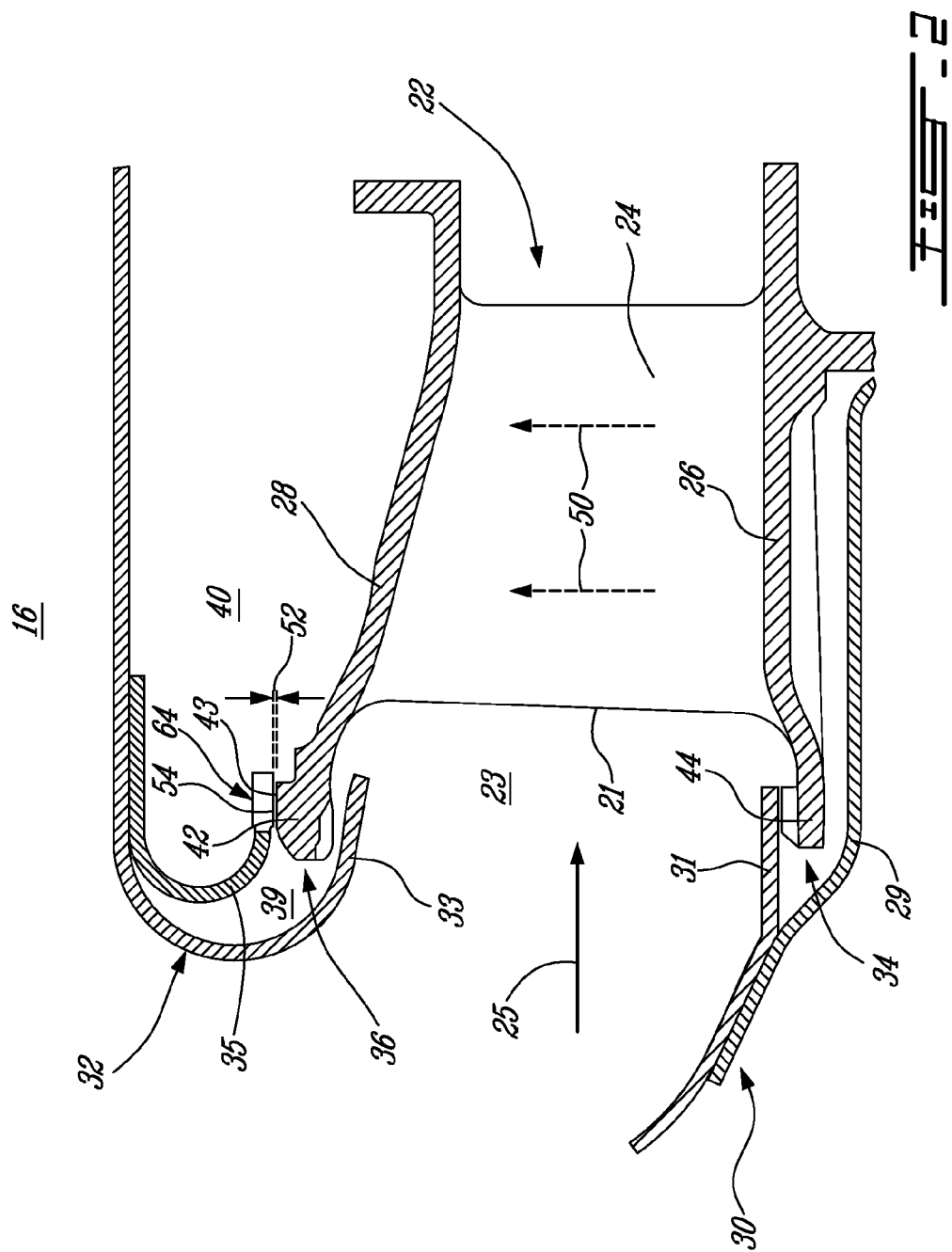
FIG. 2 is a cross-section of the sliding joint between a gas turbine engine combustor and a high pressure turbine vane ring in accordance with the present invention.

Referring to FIG. 2, the interface between the combustor 16 and the HPT vane assembly 22 is shown. The HPT vane assembly 22 comprises a plurality of airfoils 24 radially extending between annular inner platform 26 and outer platform 28, which are circumferentially disposed about a central longitudinal axis 11 (see FIG. 1) of the gas turbine engine to define an annular gas-path passage 23 therebetween, within which the hot combustion gases are channeled generally in direction 25. The HPT vane assembly 22 is located immediately downstream from the combustor 16, and is accordingly engaged thereto at the combustor exit. Generally, the vane inner platform 26 of the HPT vane assembly 22 is engaged to a first, or radially inner, wall 30 of the combustor 16 by an inner joint assembly 34, and the vane outer platform 28 is engaged to a second, or radially outer, wall 32 of the combustor 16 by an outer joint assembly 36.

An integral upstream lug portion 44 of the vane inner platform 26 extends upstream from the leading edge 21 of the vane airfoil 24, and projects into an annular slot defined between an outer flange portion 31 and an inner flange portion 29 of the combustor inner wall 30. The inner joint assembly 34 accordingly formed, permits the upstream lug portion 44 of the vane inner platform 26 to be relatively axially displaceable within the flange portions 29, 31 of the combustor inner wall 30. Particularly, the inner joint assembly 34 is a sliding-type joint, which permits the upstream lug portion 44 of the vane inner platform 26 to axially slide within the flange portions of the combustor inner wall 30 in a direction substantially parallel to the direction 25 of the hot gas flow (i.e. parallel to the central longitudinal axis 11 of the engine 10). The inner joint assembly 34 may also permit a small radial displacement of the upstream lug portion 44 relative to the inner and outer flange portions 29 and 31 of the combustor inner wall 30 in the form of a radial thermal growth differential generated therebetween.

Referring now to the outer joint assembly 36 between the HPT vane assembly 22 and the upstream combustor 16, an upstream end or lug portion 42 of the vane outer platform 28 projects upstream from the leading edge 21 of the vane airfoil 24, for engagement with the outer wall 32 of the combustor 16. The combustor's outer wall 32 comprises an inner flange portion 33, which is preferably integrally formed with the main wall of the combustor, and an outer flange portion (or finger portion) 35 which together define annular space-apart portions of the outer combustor wall 32 at exit of the combustor 16. The inner flange portion 33 and the outer flange portion 35 define a radial gap or slot 39 therebetween. The upstream lug portion 42 of the vane outer platform 28 freely extends within the radial slot 39, such that relatively displacement between the upstream lug portion 42 and the combustor outer wall 32 is possible. Particularly, the upstream lug portion 42 is able to axially slide therewithin. Accordingly, the outer joint assembly 36 is also a sliding-type joint, and provides a sealing joint which is able to accommodate thermal deflection of the parts without requiring any locating fasteners such as rivets or bolts.

During operation of the gas turbine engine 10, the hot combustion gases flowing through the annular gas path passage 23 cause thermal growth of the HPT vane assembly 22, including the outer and inner platforms 28, 26 thereof, particularly in the outer radial direction 50. While one would typically expect corresponding thermal growth of the combustor walls, at least the outer flange portion 35 of the combustor outer wall 32 generally does not expand as much as the outer platform 28 of the vane assembly, as it is not in direct contact with the hot combustion gases and is exposed to the cooler high pressure air fed to the region 40 surrounding the combustor 16. Accordingly, the outer flange portion 35 experiences lower thermal growth in a radially outward direction 50 than does the upstream end 42 of the outer platform 28. This resulting thermal growth differential causes a reduced radial clearance gap 52 in the sliding outer joint assembly 36 during engine operation, particularly between the outer flange portion 25 of the combustor outer wall 32 and the upstream end 42 of the vane outer platform 28.

However, too much thermal growth of the platforms of the HPT vane assembly relative to the combustor walls can cause binding to occur in the sliding joints therebetween. Conversely, too little can leave a radial clearance gap 52 therebetween which is large enough to allow leakage therethrough. Unless a reasonably efficient radial seal is created between the outer and inner platforms 28, 26 and the corresponding combustor walls 32, 30, the high pressure air fed to the region 40 around the combustor 16 can leak into the lower pressure gas path 23 flowing through the HPT stage 17 of the turbine section 18. The upstream end 42 of the vane outer platform 28 has a radially outer surface 43 which opposes an inwardly facing surface 54 of the aligned portion the outer flange portion 35 of the combustor outer wall 32. The radial clearance gap between the outer vane platform 28 and the outer combustor wall 32 is therefore radially defined between the outer surface 43 and the inwardly facing surface 54 thereof.

Therefore, when the gas turbine engine is in operation, the radial clearance gap 52 defined between the outer platform 28 and the opposed outer wall of the combustor is ideally minimized (i.e. kept as small as possible) such as to provide a substantial radial seal between the two components. However, in order to prevent any binding therebetween, which can occur if this radial clearance gap 52 is eliminated completely (for example, if thermal growth of the outer platform is significantly greater than the clearance gap 52 in a cold or ambient temperature), at least a small clearance gap 52 is also preferably maintained through the range of engine operating temperatures.

However, this need to select a cold radial clearance gap 52 sufficient to allow for a minimized but maintained clearance gap at hot engine operating temperatures is made further difficult by the fact that different regions of the vane platforms experience different amounts of thermal growth. For example, either due to higher local temperature pockets, different geometries, different cooling airflow patterns, etc., certain regions of the vane platforms 28, 26 experience greater thermal growth than others, particularly in the radial direction 50.

Figure 3:
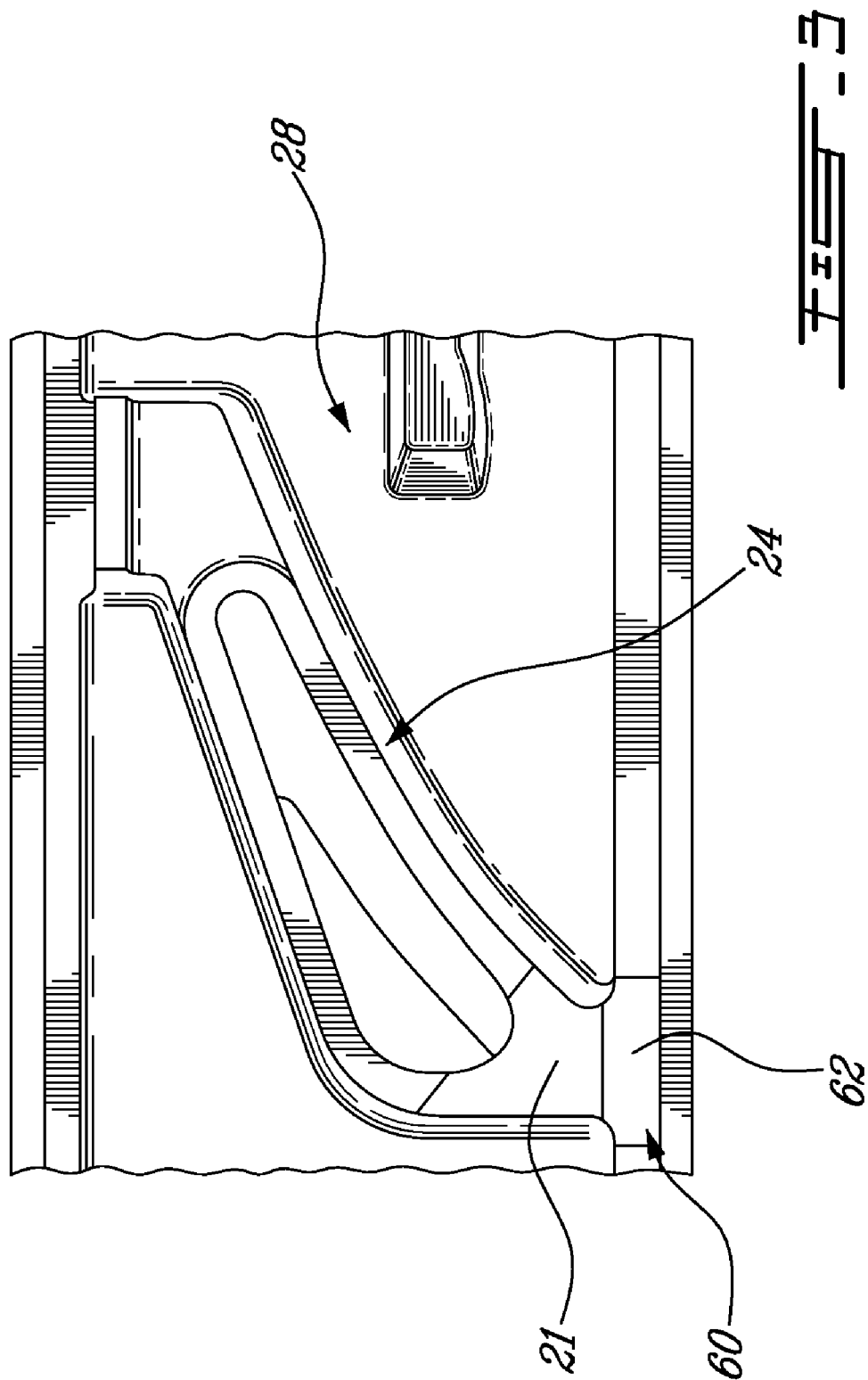
FIG. 3 is a top plan view of an outer vane platform of the high pressure turbine vane ring in accordance with the present invention.
Figure 4:
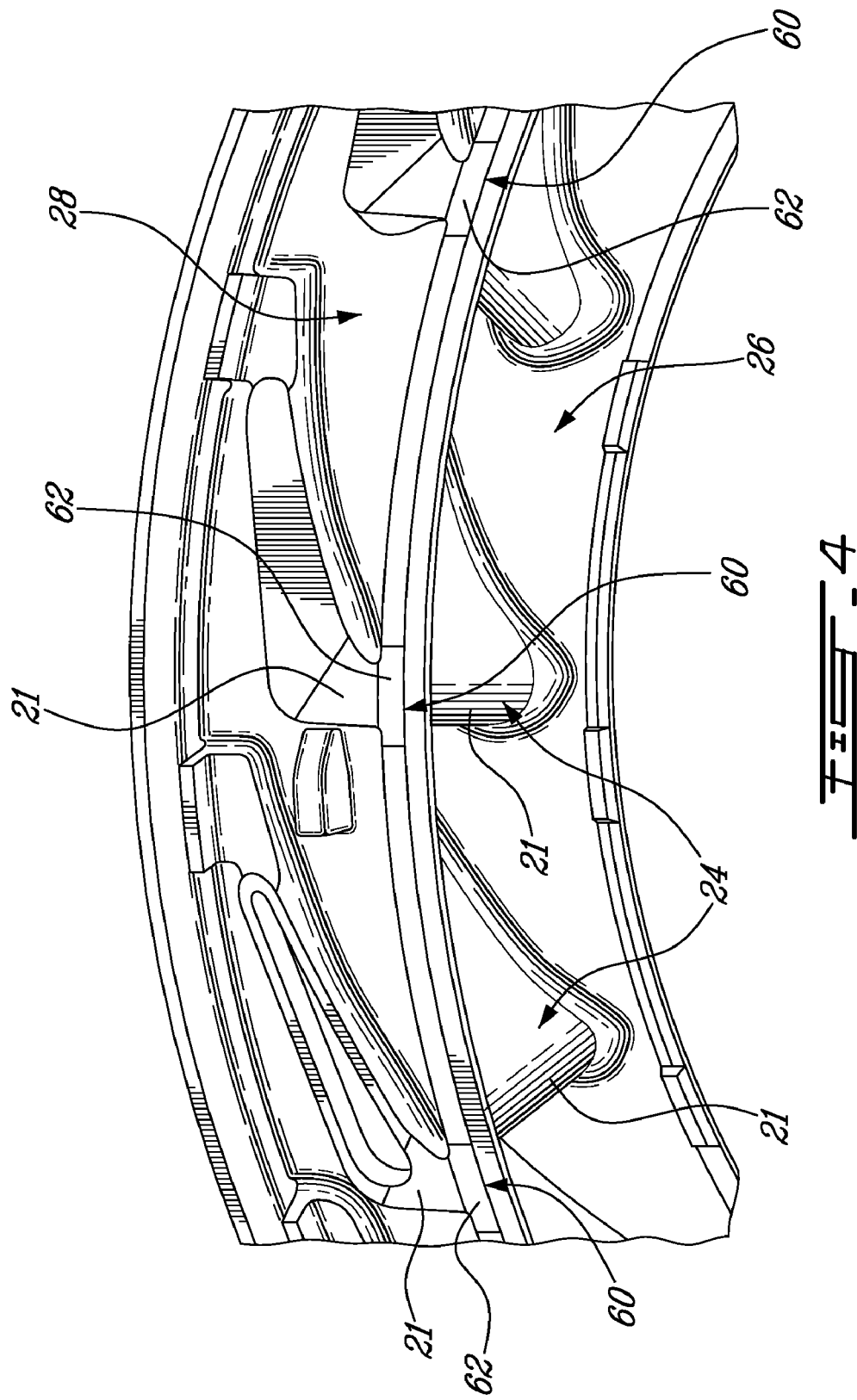
FIG. 4 is a top perspective view of the high pressure turbine vane ring of FIG. 3.

Referring now to FIGS. 3 and 4, with particular reference to the outer vane platform 28, the radial thermal growth due to a given thermal load (i.e. certain engine operating temperature) is greater directly in front of and aligned with the leading edges 21 of each of the airfoils 24, and is lower further away therefrom. Therefore the circumferentially spaced apart regions 60 immediately upstream the leading edges 21 of each of the airfoils 24 experiences greater thermal growth radially outwards (i.e. in direction 50 towards the surface 54 of the outer flange portion 35 of the combustor outer wall 32, as shown in FIG. 2), than the regions therebetween about the full circumference of the annular outer platform 28. Accordingly, a plurality of depressions 62 are formed in the radially outer surface 43 of the outer platform 28, more particularly the upstream end 42 thereof, opposite the outer flange portion 35 of the combustor outer wall 32. The depressions 62 are located therein within each of the above-mentioned regions 60 of expected greater thermal growth. The depressions 62 may be a variety of shapes and depths, provided that they remove a sufficient amount of the outer platform 28 within the regions 60 to prevent the thermal growth of the ring due to exposure to elevated engine operating temperatures to be greater in these regions than outside thereof. In other words, by removing material in the regions 60 which are expected to expand outward more than other regions of the platform, a substantially more uniform expansion of the outer platform 28 results when it is heated. Therefore, although the radial growth of the outer platform within these regions 60 may remain the same, the absolute distance outward from the rest of the platform which the material within the regions will project will be less (compared to an evenly circumferential platform ring, for example), in view of the depressions 62. Another way of describing this would be that the depressions 62 create local reductions, circumferentially aligned with each of the airfoils, in the radial distance from a central reference point (such as the engine axis 11) at ambient temperature such that, upon heating of the platform, the material within the depressions will expand radially, however not more so than the rest of the annular platform.

The radial gap 52 between the outer platform 28 and outer combustor wall 32 (i.e. the so called "small exit duct" portion of the combustor 16) can therefore be optimized, such that it is minimized but not eliminated completely during the range of engine operating temperatures. Accordingly, the "cold" size of the radial gap 52 (i.e. at ambient temperature) is selected such that, upon an expected amount of radial thermal growth when exposed to the predetermined engine operating temperatures, the "hot" size of the radial gap 52 will be small enough to limit significant gas leakage therethrough while remaining sufficient large enough to prevent binding between the outer platform and the opposed combustor flange 35.

Therefore, in order to provide such an interface between the combustor and the vane assembly in the gas turbine engine, a plurality of the depressions 62 are first formed in at least the outer platform 28, opposite the combust exit flange portion 35 of the outer combustor wall 32 and within the regions 60 of expected higher thermal growth. Accordingly, the thermal growth of the entire outer platform 28 will be substantially uniform circumferentially therearound when exposed to the hot engine operating temperatures. Next, a maximum amount of thermal growth differential exhibited between the flange portion 35 and the outer platform 28 over an entire range of the engine operating temperatures is determined. Then, the cold radial clearance gap 52 between the flange portion 35 and the outer platform 28 at ambient temperature is defined, such that it is slightly greater than the determined maximum amount of thermal growth differential over the engine operating temperature range. This accordingly permits the radial clearance gap 52 at hot engine operating temperatures to be minimized, but nonetheless maintained, thereby providing substantial radial sealing between the vane assembly and the combustor while preventing binding contact therebetween.

The depressions 62, in at least one embodiment, include flats in the otherwise curved annular outer surface 54, which may be formed by any suitable method such as machining, casting or the like. Although the depressions 62 are likely only very slight (for example, flat regions formed into the curved outer circumferential surface of the platform's upstream end), if more extreme differences are expected in the thermal growth of these regions relative to the circumferentially spaced about regions between each airfoil, then the depressions 62 within regions 60 may be made more dramatic (for example having a greater, and therefore perhaps more visually noticeable, depth within the outer platform).

Referring to FIG. 5, the outer flange portion 35 of the outer combustor wall 32 is shown in cooperation with the upstream end 42 of the outer platform 28. More specifically, the outer circumferential surface 43 of the upstream end 42 of the vane assembly's outer platform 28 opposes the inner circumferential surface 54 of the downstream end of the outer flange portion 35 that is in axial alignment therewith. In the embodiment depicted, this downstream end of the outer combustor flange portion 35 constitutes a machined or cast wall section 64 which is fixed (by any suitable method, such as welding, brazing, fastening, etc.) to the curved portion of the outer flange portion 35 which is preferably made of sheet metal. This permits a greater accuracy (as opposed to a construction wherein the entire outer flange portion 35 is made of sheet metal) in defining the clearance gap 52 between the inner surface 54 of this wall section 64 and the outer circumferential surface 43 of the outer platform's upstream end 42. For example, if the wall section 64 is made of the same material and has an at least somewhat similar size/thickness/etc as the upstream end of the outer platform, the thermal growth differential therebetween will be less pronounced.

Although the radial clearance gap 52 between the outer vane platform 28 and the outer combustor wall 32 is described above, a similar radial clearance gap between the inner vane platform 26 and the inner combustor wall 30 similarly exists within the inner sliding joint 34. Similarly, the upstream end 44 of the inner platform 26 also may include similar depressions 62 therein in regions 60 of expected greater thermal growth, as described above relative to the outer platform.

The sliding joint connections between both the vane outer and inner platforms 28,26 and the corresponding combustor walls 32,30 improve the engagement between the HPT vane assembly 22 and the combustor 16 at engine operating temperature. In comparison with typical rigidly fixed prior art combustor-HPT vane joints, the outer and inner joint assemblies 34,36, and particularly the outer joint assembly 36, comprise fewer parts, require no permanent fasteners such as rivets or bolts, and provide improved sealing as a result of the thermal growth differential between the vane outer platform 28 and the cooler combustor outer flange portion 35. In all gas turbine engines, and particularly those intended for aerospace applications, weight and cost considerations are of prime importance. Accordingly, reducing the number of parts and simplifying their design is a constant goal of all aerospace designers and engineers. The combustor sliding joint assemblies 34,36 achieve this by providing sealing connections which have fewer, less complex parts, thereby greatly simplifying the connection between the HPT vane assembly 22 and the combustor 16, particularly at the outer joint assembly 36 between the vane outer platform 28 and the combustor outer wall 32.

The embodiments of the invention described above are intended to be exemplary. Still other modifications are available, and those skilled in the art will therefore appreciate that the forgoing description is illustrative only, and that various alternatives and modifications can be devised without departing from the spirit of the present invention. Accordingly, the present invention is intended to embrace all such alternatives, modifications and variances which fall within the scope of the appended claims.

The invention claimed is:

1. An assembly for a gas turbine engine, the assembly comprising a combustor and a vane assembly downstream from the combustor, the vane assembly including a plurality of airfoils radially extending between annular inner and outer platforms defining an annular gas path therebetween, at least the outer platform forming a first sliding joint connection with an adjacent outer combustor wall such that relative axial displacement therebetween is permitted, a radial clearance gap being defined between the outer platform and the outer combustor wall, said radial clearance gap being minimized at engine operating temperature such that radial sealing between the outer platform and the outer combustor wall is substantially provided, and wherein the outer platform includes a plurality of radial depressions located in an outer circumferential surface thereof opposite said outer combustor wall, said radial depressions being solely disposed in regions of expected higher thermal growth about the circumference of the outer platform such that thermal growth of the outer platform is substantially uniform circumferentially therearound and thus said minimized radial clearance gap is maintained during engine operation to prevent binding contact between the outer platform and the outer combustor wall, each depression providing a reduced thickness of the outer platform over the entirety of the surface of an associated one of the regions of expected higher thermal growth.

2. The assembly as defined in claim 1, wherein said radial depressions are disposed in said outer platform in circumferential alignment with at least a leading edge of each of said airfoils.

3. The assembly as defined in claim 1, wherein said radial depressions are flats formed in the outer circumferential surface of the outer platform.

4. The assembly as defined in claim 3, wherein said flats are machined flats.

5. The assembly as defined in claim 1, wherein the outer combustor wall which is opposite said outer circumferential surface of the outer platform includes a wall section insert which is one of cast and machined.

6. The assembly as defined in claim 5, wherein the wall section insert is fixed to a portion of the outer combustor wall composed of sheet metal.

7. The assembly as defined in claim 1, wherein the inner platform forms a second sliding joint connection with an adjacent inner combustor wall, the second sliding joint connection permitting relative axial displacement between the inner platform and the inner combustor wall.

8. The assembly as defined in claim 7, wherein the inner platform includes a plurality of second radial depressions located on a circumferential surface thereof opposite the inner combustor wall, each of said second radial depressions extending over the entirety of a region of expected higher thermal growth about the circumference of the inner platform such that thermal growth of the inner platform is substantially uniform circumferentially therearound.

9. The assembly as defined in claim 7, wherein the outer platform and the inner platform include upstream ends which respectively mate with the outer and inner combustor walls to form the first and second sliding joint connections, the upstream ends of the outer platform and the inner platform project upstream from a leading edge of the airfoil.

10. The assembly as defined in claim 9, wherein the outer and inner combustor walls comprise a bifurcated flange at an exit of the combustor, the bifurcated flange having a first flange portion and a second flange portion radially spaced apart therefrom in a direction away from the annular gas path, thereby defining an annular gap between the first flange portion and the second flange portion within which the upstream ends of the outer platform and the inner platform are received.

11. An assembly for a gas turbine engine, the assembly comprising:
a combustor having a combustor wall circumscribing a gas path therewithin and an exit duct end, the exit duct end having an outer flange portion radially spaced from the combustor wall in a direction away from the gas path to form an annular slot;
a vane assembly disposed downstream of the combustor, the vane assembly including a plurality of airfoils extending between annular inner and outer platforms; and
a portion of at least the outer platform extending axially within said annular slot and defining a sliding joint connection between the combustor and the vane assembly, the sliding joint connection permitting relative axial displacement between the vane assembly and the combustor, said portion of the outer platform including a plurality of radial depressions located in an outer circumferential surface thereof opposite said outer flange portion and extending only partly through the outer platform in a radial direction relative to said annular outer platform, said radial depressions being solely disposed in regions of expected higher thermal growth about the circumference of the outer platform such that thermal growth of the outer platform is substantially uniform circumferentially therearound, each region of expected higher thermal growth having a reduced thickness between the outer circumferential surface and an opposed inner circumferential surface of the outer platform and that substantially over all the surface of expected higher thermal growth.

12. The assembly as defined in claim 11, wherein a radial clearance gap is defined between the outer circumferential surface of the outer platform and the outer flange portion, a maximum amount of said substantially uniform circumferential thermal growth of the outer platform during engine operation being predetermined such that said radial clearance gap is minimized but maintained at engine operating temperature, thereby providing substantial radial sealing between the outer platform and the combustor while preventing binding contact therebetween.

13. The assembly as defined in claim 11, wherein said radial depressions are disposed in said outer platform in circumferential alignment with at least a leading edge of each of said airfoils.

14. The assembly as defined in claim 11, wherein said radial depressions are flats formed in the outer circumferential surface of the outer platform.

15. The assembly as defined in claim 14, wherein said flats are machined flats.

16. The assembly as defined in claim 11, wherein a second sliding joint connection is provided between the inner platform and the combustor exit duct end.

17. The assembly as defined in claim 11, wherein the inner platform forms a second sliding joint connection with an adjacent inner combustor wall, the second sliding joint connection permitting relative axial displacement between the inner platform and the inner combustor wall.

18. The assembly as defined in claim 17, wherein the inner platform includes a plurality of second depressions located on a circumferential surface thereof opposite the inner combustor wall, said second depressions being disposed in regions of expected higher thermal growth about the circumference of the inner platform such that thermal growth of the inner platform is substantially uniform circumferentially therearound.

* * * * *